UNITED STATES PATENT OFFICE.

PAUL BRONNER, OF STUTTGART, GERMANY.

MAKING WHITE LEAD.

SPECIFICATION forming part of Letters Patent No. 431,505, dated July 1, 1890.

Application filed December 27, 1889. Serial No. 335,135. (No specimens.)

*To all whom it may concern:*

Be it known that I, PAUL BRONNER, a subject of the King of Würtemberg, residing at Stuttgart, in the Kingdom of Würtemberg and German Empire, have invented new and useful Improvements in the Manufacture of White Lead, of which the following is a specification.

This invention relates to a new process for manufacturing white lead, which is based upon the property of the normal lead sulphate that the same when being heated with a certain quantity of soda-lye is very easily decomposed, provided the quantity of soda-lye is such that a basic sulphate and not lead hydroxide (hydrate-of-lead oxide) is formed, and upon the property that the basic sulphate thus produced, when treated with sodium carbonate, is readily transformed into the basic carbonate.

If the quantity of soda-lye employed in the treatment of the normal lead sulphate is so selected that either the compound $2PbSO_4,Pb(HO)_2$ or the compound $3PbSO_4,Pb(HO)_2$ is formed, these compounds, when heated with the proper quantities of sodium carbonate, can be transformed directly into excellent white lead $2PbCO_3,Pb(HO)_2$ $3PbCO_3,Pb(HO)_2$, respectively. The by-product is Glauber's salt (natrium sulphate.) In the first case three molecules of the lead sulphate freshly precipitated, undried and purified by washing, are heated with two molecules of normal soda, whereby the basic salt $2PbSO_4,Pb(HO)_2$ is readily formed according to the formula $3PbSO_4+2NaHO=2PbSO_4,Pb(HO)_2+Na_2SO_4$. In the second case four molecules of lead sulphate are transformed by means of two molecules of normal soda, according to the following formula: $4PbSO_4+2NaHO=3PbSO_4,Pb(HO)_2+Na_2SO_4$.

The transformation sets in rapidly at a temperature of 70° Celsius, (158° Fahrenheit,) and a swelled crummy mass is formed, which has the tendency to form lumps, which must be prevented by constant stirring. The completion of the transformation can be readily ascertained by the entire disappearance of the alkaline reaction of the mixture. The basic sulphate thus obtained, notwithstanding its pure whiteness, cannot be used as a paint, since it has not sufficient covering quality. By heating the same with a solution of sodium carbonate it can, however, be readily transformed into white lead, according to the following formulas: $2PbSO_4,Pb(HO)_2+2Na_2CO_3=2PbCO_3,Pb(HO)_2+2Na_2SO_4$ or $3PbSO_4,Pb(HO)_2+3Na_2CO_3=3PbCO_3,Pb(HO)_2+3Na_2SO_4$. It is not necessary to draw off the solution of Glauber's salt, which covers the basic lead sulphate, but the proper quantity of the soda solution can be added at once and then the mixture is heated. It is desirable, however, to take a small excess of soda beyond the quantity found by calculation, since such excess materially facilitates the transformation. If desired, however, the lead sulphate can be heated at once with a solution containing caustic soda and sodium carbonate. The crummy condition of the precipitate disappears slowly and changes to a finely-pulverized condition, while at the same time the volume of the mass is considerably reduced. The completion of the transformation is ascertained if a test taken from the mass and well washed dissolves in dilute pure nitric acid or in acetic acid without a residuum. The solution which covers the precipitate and which contains Glauber's salt is finally drawn off and the white lead is washed, pressed, and dried.

The product obtained by this process is very beautiful and extremely fine, it covers well, it requires no grinding or rubbing, and the cost of its production can compete successfully with that of the best processes known to me. Furthermore, by my process I am enabled to transform the lead sulphate which is obtained in cotton-print works as a by-product into white lead, which can be readily sold with a profit. The lead sulphate may also be produced from litharge, sugar of lead, or nitrate of lead, and then transformed into white lead with a good profit.

I am aware of the patent granted to Thomas M. Fell and Ambrose G. Fell, dated July 24, 1866, No. 56,685, and I confine my claim to the distinct and well-defined process described in the foregoing specification.

What I claim as new, and desire to secure by Letters Patent, is—

The process of making white lead, which consists in transforming normal lead sulphate into a basic salt—such as $2PbSO_4Pb(HO)_2$ or $3PbSO_4,Pb(HO)_2$—by heating the same with the quantities of caustic alkaline lyes hereinbefore specified, and then heating this basic salt together with a solution of an excess of sodium carbonate, substantially as described.

In testimony whereof I have hereunto set my hand in the presence of two subscribing witnesses.

PAUL BRONNER.

Witnesses:
CHARLES A. SCHLEGEL,
FERD. OBERMANN.